United States Patent
Jiang et al.

(10) Patent No.: US 11,184,216 B2
(45) Date of Patent: Nov. 23, 2021

(54) STATE CONTROL METHOD AND APPARATUS

(71) Applicant: TENCENT TECHNOLOGY (SHENZHEN) COMPANY LIMITED, Shenzhen (CN)

(72) Inventors: Lei Jiang, Shenzhen (CN); Haobo Shan, Shenzhen (CN); Jinyuan Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 116 days.

(21) Appl. No.: 16/110,239

(22) Filed: Aug. 23, 2018

(65) Prior Publication Data

US 2018/0367365 A1 Dec. 20, 2018

Related U.S. Application Data

(63) Continuation of application No. PCT/CN2017/072456, filed on Jan. 24, 2017.

(30) Foreign Application Priority Data

Mar. 3, 2016 (CN) .......................... 201610121881.1

(51) Int. Cl.
*H04L 12/24* (2006.01)
*G06F 9/448* (2018.01)

(52) U.S. Cl.
CPC ........ *H04L 41/0233* (2013.01); *G06F 9/4498* (2018.02)

(58) Field of Classification Search
CPC ............................ H04L 41/0233; G06F 9/4498
(Continued)

(56) References Cited

U.S. PATENT DOCUMENTS 6,031,549 A * 2/2000 Hayes-Roth ............ G06T 13/40
345/474
6,317,638 B1 * 11/2001 Schreder .............. G05B 19/042
700/2
(Continued)

FOREIGN PATENT DOCUMENTS

CN 103049264 A 4/2013
CN 103049838 A 4/2013
(Continued)

OTHER PUBLICATIONS

The Japan Patent Office (JPO) Notification of Reasons for Refusal for Application No. 2018-544453 and Translation dated Feb. 3, 2020 4 Pages.

(Continued)

*Primary Examiner* — Joseph L Greene
(74) *Attorney, Agent, or Firm* — Anova Law Group, PLLC

(57) ABSTRACT

A state control method includes detecting an operation execution event used for requesting to operate on a first object in a first application. The method also includes determining whether a next node of a current node of the first object in a hybrid state machine is a first state node or a first behavior-tree node. Nodes in the hybrid state machine includes at least a state node and a behavior-tree node, and a state change relationship exists among the nodes in the hybrid state machine. The method further includes, when it is determined that the next node is the first state node, performing on the first object an operation in a first state corresponding to the first state node; and, when it is determined that the next node is the first behavior-tree node, performing on the first object an operation in a first behavior-tree corresponding to the first behavior-tree node.

18 Claims, 8 Drawing Sheets

(58) Field of Classification Search
USPC .......................................................... 709/223
See application file for complete search history.

(56) References Cited

U.S. PATENT DOCUMENTS

| | | | |
|---|---|---|---|
| 2006/0235548 A1 | 10/2006 | Gaudette | |
| 2009/0254217 A1 | 10/2009 | Pack et al. | |
| 2010/0192078 A1* | 7/2010 | Hwang | H04N 21/44012 715/764 |
| 2011/0307433 A1* | 12/2011 | Dlugosch | G06N 5/02 706/45 |
| 2012/0010772 A1* | 1/2012 | Pack | B25J 9/1664 701/27 |
| 2012/0158938 A1* | 6/2012 | Shimonishi | H04L 41/0233 709/223 |
| 2014/0053261 A1* | 2/2014 | Gupta | G06F 21/55 726/22 |
| 2016/0277800 A1* | 9/2016 | Wang | H04N 21/4667 |

FOREIGN PATENT DOCUMENTS

| | | |
|---|---|---|
| CN | 105117575 A | 12/2015 |
| CN | 105656688 A | 6/2016 |
| JP | H8194612 A | 7/1996 |
| KR | 20110000689 A | 1/2011 |
| WO | 2016147620 A1 | 9/2016 |

OTHER PUBLICATIONS

Historia, "[UE 4] How to Use BehaviorTree", Nov. 5, 2014, Historia Inc., Retrieved from the InternetURL: http://historia.co.jp/%3Fp%3D1102, the whole document 18 Pages (including translation).

The Japan Patent Office (JPO) Notification of Reasons for Refusal for Application No. 2018-544453 and Translation dated Sep. 30, 2019 8 Pages.

Digital Game Textbook Production Committee, "Textbooks of the digital games", SoftBank Creative Corporation, May 4, 2010, First Edition, pp. 130-131, 440-441 7 Pages.

The European Patent Office (EPO) The Extended European Search Report for 17759084.1 dated Oct. 1, 2019 7 Pages.

Korean Intellectual Property Office (KIPO) Office Action 1 for 20187023912 dated Dec. 16, 2019 8 Pages (including translation).

The World Intellectual Property Organization (WIPO) International Search Report for PCT/CN2017/072456 dated Mar. 27, 2017 5 Pages (including translation).

* cited by examiner

STATE CONTROL METHOD AND APPARATUS

RELATED APPLICATION

This application is a continuation application of PCT Patent Application No. PCT/CN2017/072456, filed on Jan. 24, 2017, which claims priority to Chinese Patent Application 201610121881.1, filed with the Chinese Patent Office on Mar. 3, 2016 and entitled "STATE CONTROL METHOD AND APPARATUS", all of which are incorporated herein by reference in entirety.

FIELD OF THE TECHNOLOGY

The present disclosure relates to the field of computer technologies and, specifically, to a state control method and apparatus.

BACKGROUND OF THE DISCLOSURE

Currently, in an application, manners of controlling an entity to perform an operation generally include a finite state machine and a behavior tree. However, during an operation execution process, a finite state machine and a behavior tree respectively have their own defects. Specifically, for the finite state machine, when there are a large number of states, the finite state machine needs to process a large quantity of state conversion relationships, not only increasing workload of a designer, but also being inconvenient for maintenance of the finite state machine, and consequently the entity in the application performs the operation in low efficiency. For the behavior tree, the behavior tree is not intuitive in terms of state change. The behavior tree is suitable for performing a series of behaviors as planned, and cannot effectively process state changes in some abnormal and special cases.

The disclosed methods and systems are directed to solve one or more problems set forth above and other problems.

SUMMARY

Embodiments of the present disclosure provide a state control method and apparatus to at least resolve the technical problem of low efficiency when using a finite state machine to control an individual in an application to perform an operation.

According to an aspect of the present disclosure, a state control method is provided. The method includes detecting an operation execution event, and the operation execution event is used for requesting to operate on a first object in a first application. The method also includes determining whether a next node of a current node of the first object in a hybrid state machine is a first state node or a first behavior-tree node, where nodes in the hybrid state machine include at least a state node and a behavior-tree node, and a state change relationship exists among the nodes in the hybrid state machine. Further the method includes, when it is determined that the next node of the current node is the first state node, performing on the first object an operation in a first state corresponding to the first state node and, when it is determined that the next node of the current node is the first behavior-tree node, performing on the first object an operation in a first behavior-tree corresponding to the first behavior-tree node.

According to another aspect of the present disclosure, a state control apparatus is provided. The apparatus includes a memory storing computer program instructions; and a processor coupled to the memory. When executing the computer program instructions, the processor is configured to perform: detecting an operation execution event, the operation execution event being used for requesting to operate on a first object in a first application; determining whether a next node of a current node of the first object in a hybrid state machine is a first state node or a first behavior-tree node, nodes in the hybrid state machine including at least a state node and a behavior-tree node, and a state change relationship existing among the nodes in the hybrid state machine; and when it is determined that the next node of the current node is the first state node, performing on the first object an operation in a first state corresponding to the first state node; and when it is determined that the next node of the current node is the first behavior-tree node, performing on the first object an operation in a first behavior-tree corresponding to the first behavior-tree node.

According to another aspect of the present disclosure, a non-transitory storage medium is provided. The storage medium stores computer readable instructions executable by at least one processor. The computer readable instructions can cause the at least one processor to perform: detecting an operation execution event, the operation execution event being used for requesting to operate on a first object in a first application; determining whether a next node of a current node of the first object in a hybrid state machine is a first state node or a first behavior-tree node, nodes in the hybrid state machine including at least a state node and a behavior-tree node, and a state change relationship existing among the nodes in the hybrid state machine; and when it is determined that the next node of the current node is the first state node, performing on the first object an operation in a first state corresponding to the first state node; and when it is determined that the next node of the current node is the first behavior-tree node, performing on the first object an operation in a first behavior-tree corresponding to the first behavior-tree node.

Other aspects of the present disclosure can be understood by those skilled in the art in light of the description, the claims, and the drawings of the present disclosure.

BRIEF DESCRIPTION OF THE DRAWINGS

The accompanying drawings described herein are used to provide further understanding about the present disclosure, and form a part of this application.

DESCRIPTION OF EMBODIMENTS

Figure 1:
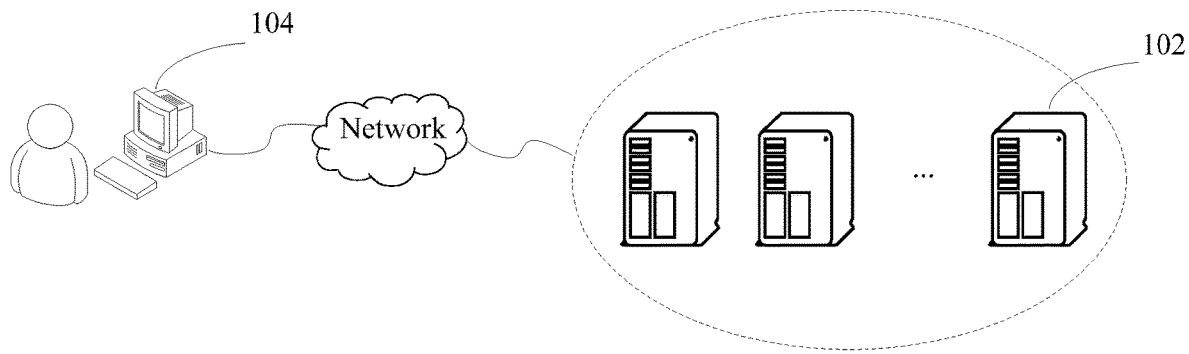
FIG. 1 is a schematic diagram of a hardware environment of a state control method according to an embodiment of the present disclosure.

To make those skilled in the art understand the solutions in the present disclosure better, the following describes the technical solutions of the present disclosure with reference to the accompanying drawings. Apparently, the described embodiments are merely some but not all of the embodiments of the present disclosure. All other embodiments obtained by a person of ordinary skill in the art based on the disclosed embodiments without creative efforts shall fall within the protection scope of the present disclosure.

It should be noted that, the terms such as "first" and "second" in the specification and claims of the present disclosure and the accompanying drawings are used to distinguish similar objects, but are not necessarily used to describe a specific sequence or a precedence level. It should be understood that, data used in this way may be interchanged in a proper circumstance, so that the embodiments of the present disclosure described herein can be implemented in a sequence different from those shown in the drawings or described herein. In addition, terms "include" and "have" and any variation thereof are intended to cover nonexclusive including. For example, a process, method, system, product, or device including a series of steps or units are not limited to those clearly listed steps or units, but may include another step or unit that is not clearly listed or is inherent for the process, method, product or device.

According to an embodiment of the present disclosure, a method embodiment of a state control method is provided.

The state control method may be applied to a hardware environment formed by a server 102 and a terminal 104 shown in FIG. 1. As shown in FIG. 1, the server 102 is connected to the terminal by a network, and the network includes but is not limited to a wide area network, a metropolitan area network or a local area network. The terminal 104 includes, not limited to, a PC, a mobile phone, a tablet computer, or the like. A data processing method in this embodiment of the present disclosure may be performed by the server 102, or may be performed by the terminal 104, or may be jointly performed by the server 102 and the terminal 104. When performed by the terminal 104, the data processing method may be alternatively performed by a client installed on the terminal 104.

Figure 2:
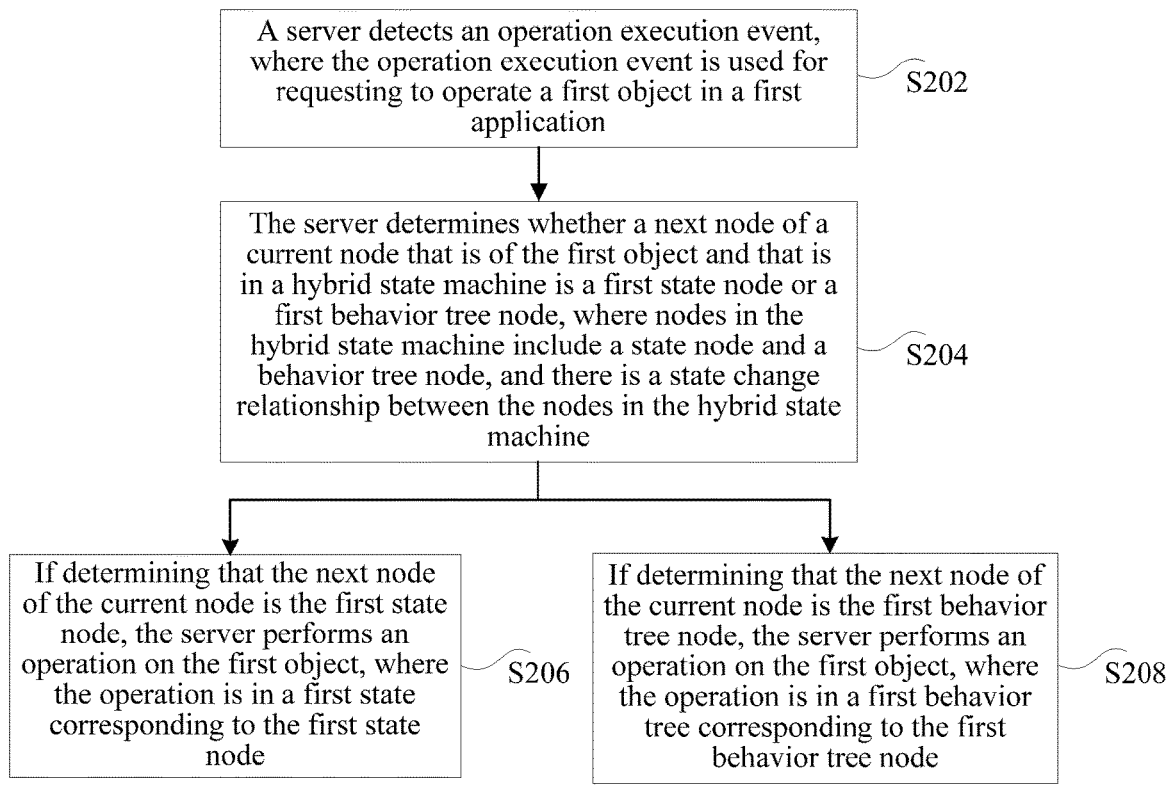
FIG. 2 is a flowchart of a state control method according to an embodiment of the present disclosure.

FIG. 2 is a flowchart of an optional state control method according to an embodiment of the present disclosure. As shown in FIG. 2, the terminal may include followings.

Step S202: A server detects an operation execution event, where the operation execution event is used for requesting to operate on a first object in a first application.

Step S204: The server determines whether a next node of the current node of the first object in a hybrid state machine is a first state node or a first behavior-tree node, where nodes in the hybrid state machine include state nodes and behavior-tree nodes, and there is a state change relationship among the nodes in the hybrid state machine.

Step S206: If it is determined that the next node of the current node is the first state node, the server performs an operation on the first object, where the operation is an operation in a first state corresponding to the first state node.

Step S208: If it is determined that the next node of the current node is the first behavior-tree node, the server performs an operation on the first object, where the operation is an operation in a first behavior-tree corresponding to the first behavior-tree node.

According to step S202 to step S208, when detecting an operation execution event, a server determines whether a next node of the current node of the first object in a hybrid state machine is a first state node or a first behavior-tree node; and if the next node of the current node is the first state node, performs on the first object an operation in a first state corresponding to the first state node; or if the next node of the current node is the first behavior-tree node, performs on the first object an operation in a first behavior-tree corresponding to the first behavior-tree node, so as to achieve the objective of using a finite state machine and a behavior-tree to jointly control an entity in an application to perform an operation, thereby achieving a technical effect of increasing efficiency of performing the operation by the entity in the application, and resolving a technical problem of low efficiency when using a finite state machine to control an entity in an application to perform an operation.

In the technical solution provided in step S202, the first application may be a game application, an instant messaging application, or an application of another type, and the first application is not limited in the present disclosure. The first application may include a plurality of entities or objects, and the plurality of objects includes the first object. The first object may be any object of the plurality of objects. It should be noted that, the object herein may be an event object that is in the application and that performs an event, for example, a character in a game. The first application may be installed on a server, or may be installed on a client (such as a smartphone or an electric energy meter), and the server is responsible for processing and maintaining an event and an object in the first application. The operation execution event may be used for requesting to perform an operation on the first object in the first application, where the performing an operation on the first object may include adjusting a movement path of the first object, controlling the first object to release a skill, or the like. This is not specifically limited in the present disclosure.

Optionally, the server may detect the operation execution event in real time, so as to respond to the operation execution event in time and accurately to perform an operation on the first object in the first application. When detecting the operation execution event in real time, the server may further detect, in real time, whether the first object in the first application is performing an operation. If the server detects that the first object is performing an operation, when detecting the operation execution event, needs to wait for the operation currently performed by the first object to be complete and then control the first object to respond to the operation execution event; or if the server detects that the first object is not performing an operation, when detecting the operation execution event, immediately controls the first object to respond to the operation execution event.

In the technical solution provided in step S204, the hybrid state machine may control an operation to be performed on the first object. It should be noted that, the hybrid state machine may control one or more objects in the first application to perform an operation. The hybrid state machine includes a finite state machine and a behavior-tree. To better describe the hybrid state machine, the finite state machine and the behavior-tree are specifically described as follows.

Figure 3:
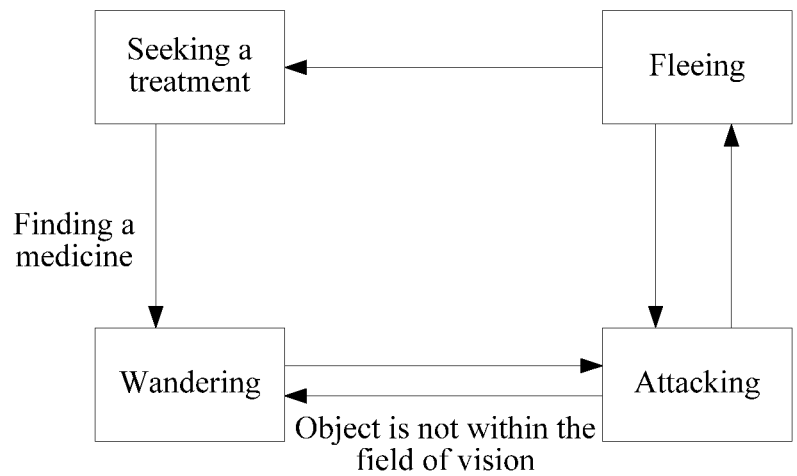
FIG. 3 is a schematic diagram of a finite state machine according to an embodiment of the present disclosure.

The finite state machine may control an entity object in an application to perform an operation, and it includes a limited number of states and a conversion condition between the states. At any particular point of time, an entity object is in only one state, and the finite state machine needs to be converted from a state to another state to perform a different operation. For example, FIG. 3 indicates four states of a game character in a game application, respectively being wandering, attacking, fleeing, and seeking a treatment, and conversion relationships between the four states. For example, a conversion condition for a game character to be converted from seeking a treatment to wandering is finding a medicine, and a conversion condition for the game character to be converted from attacking to wandering is that an object is not within the field of vision. The conversion relationships between the four states are not described by using examples one by one herein.

Figure 4A:
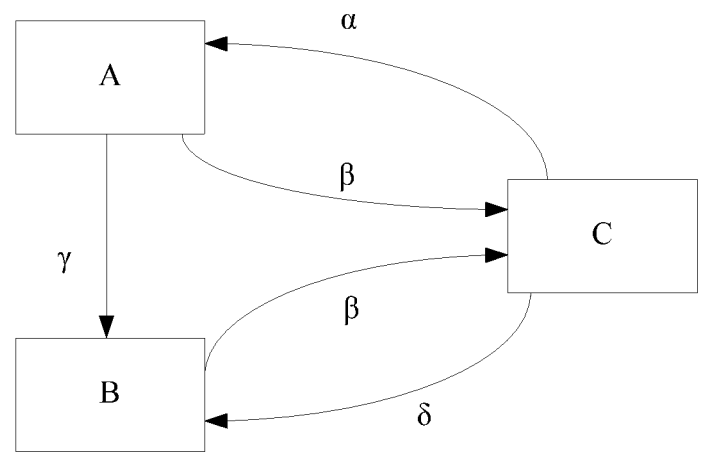
FIG. 4A is a schematic diagram of a finite state machine between state groups according to an embodiment of the present disclosure.
Figure 4B:
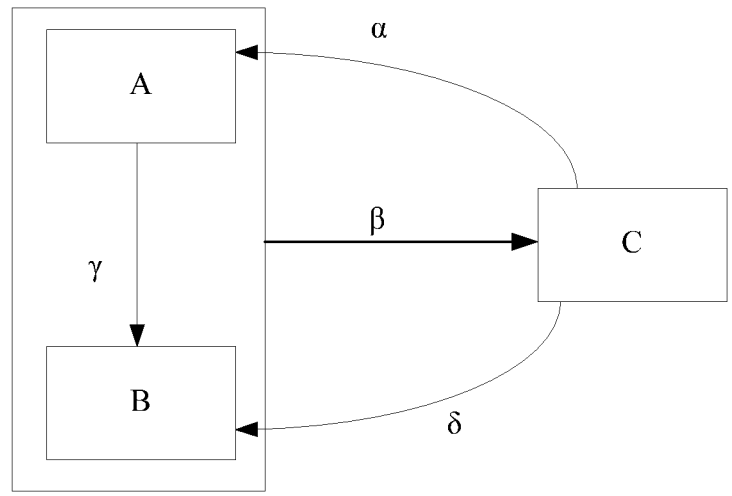
FIG. 4B is a schematic diagram of hierarchical finite state machines according to an embodiment of the present disclosure.

Finite state machines may be divided into two types, hierarchical finite state machines (HFSM for short) and stack-based finite state machines (SFSM for short). For a hierarchical finite state machine, a concept of state group is introduced, and states in different groups share a same conversion relationship. It increases granularity of state control, greatly reduces duplicate state conversion relationships, and can enable a designer to better control state conversion. As shown in FIG. 4A, a finite state machine includes three states A, B, and C. Both states A and B may change to the state C when a condition β is triggered, and then the states A and B may be grouped into a group, to eliminate duplicate state conversion triggered by the condition β for both state A and state B. A finite state machine after the grouping is the finite state machine shown in FIG. 4B.

Figure 5:
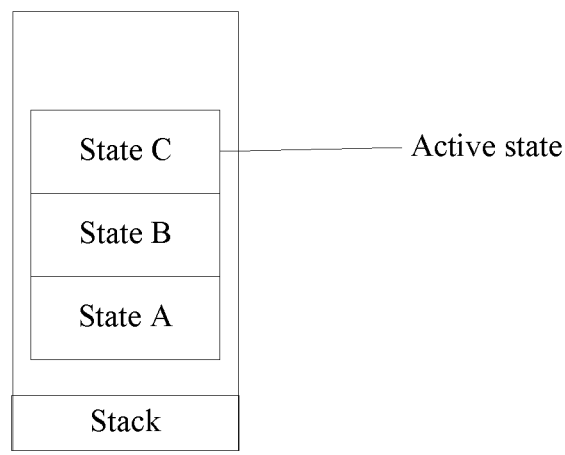
FIG. 5 is a schematic diagram of stack based finite state machines according to an embodiment of the present disclosure.

A stack based finite state machine may manage a state conversion relationship by using a stack structure. As shown in FIG. 5, the stack top stores a currently activated state C, and state conversion may be implemented by means of operations being pushed into a stack and being pulled out of the stack. The structure can effectively process cases that are based on state disruption and continuation triggered by events. For example, a new function needs to be added to a game application, to enable computer AI to be paused at any time, and then a pause state needs to be added. If a conventional finite state machine is used, a conversion relationship needs to be designed between the pause state and a state that exists in each finite state machine. If the stack based finite state machine is used, when event triggering needs to be paused, it needs only to push the pause state into a stack. When pause is ended, it needs only to pull the pause state out of the stack to recover an original state for continuous execution, greatly reducing conversion relationship designs.

It should be noted that, the hybrid state machine in this embodiment of the present disclosure may use the hierarchical finite state machine, or may use the stack based finite state machine, and this is not limited in the present disclosure.

The behavior-tree may also control an entity object in an application to perform an operation, and nodes in the behavior-tree may be divided into the following types.

Composite node (Composite): a branch in the behavior-tree, that is, a non-leaf node; composite nodes may include a selection node (Selector), a sequence node (Sequence), and a simple parallel node (Simple Parallel).

Task node (Task): a leaf node in the behavior-tree; a task node performs a specific task, for example, movement AI.

Decoration node (Decorator): dependent on a composite node or a task node, and configured to determine whether a branch or a leaf node can be executed.

Service node (Service): dependent on a composite node, invoked at a certain frequency, and configured to update information about the branch.

Root node (Root): a root of the behavior-tree.

Selection node (Selector): executing its child nodes from left to right; if one of its child nodes is successfully executed and returns a success, this node immediately stops the execution. If a child node returns a success, this node returns a success; if all child nodes return a failure, this node returns a failure.

Sequence node (Sequence): executing its child nodes from left to right; if one of its child nodes is unsuccessfully executed and returns a failure, this node immediately stops the execution. If a child node returns a failure, this node returns a failure; if all nodes return a success, this node returns a success.

Figure 6:
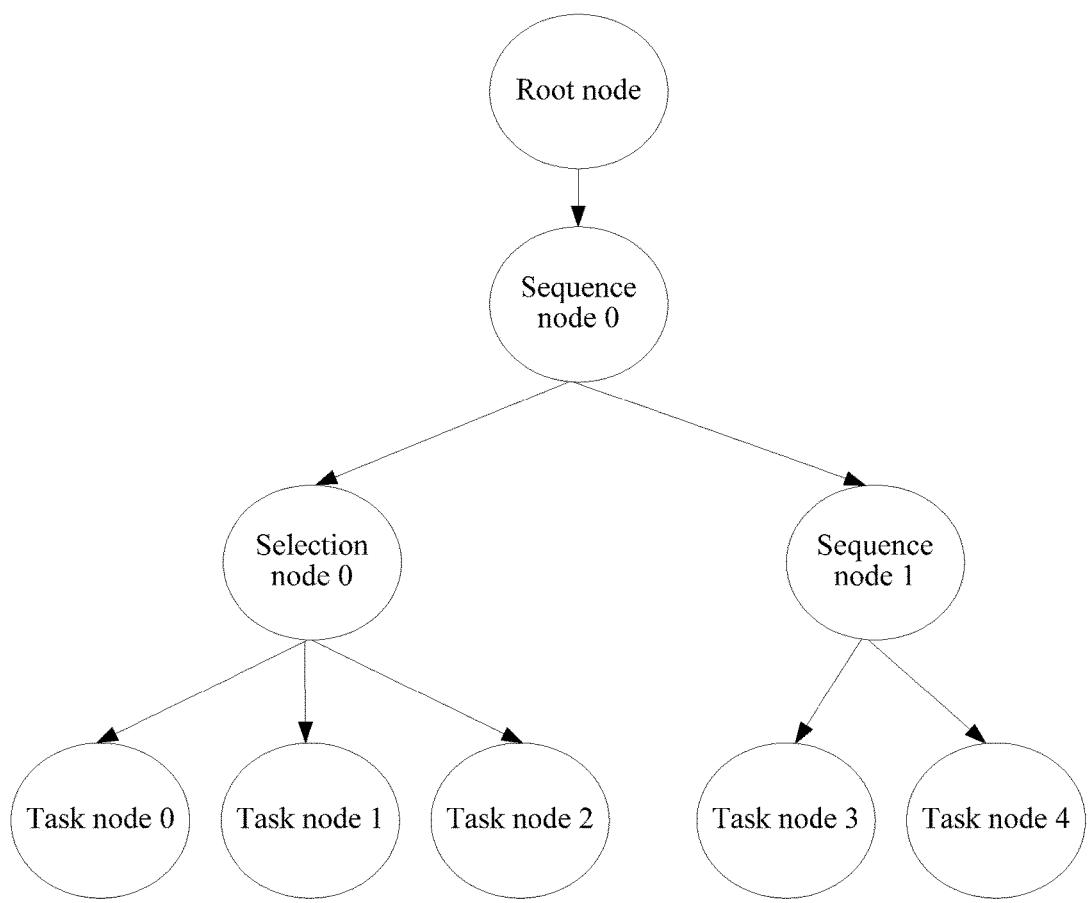
FIG. 6 is a schematic diagram of a behavior tree according to an embodiment of the present disclosure.

A basic principle of the behavior-tree is: the tree is searched from the root node top-down by using some criteria, to finally determine a leaf node that needs to be executed, and execute it. In addition to the root node, each node in the tree has a return value, which is a success or a failure according to an execution status thereof. A return value of a node is fed back to a parent node of the node, somewhat affecting a return value of the parent node thereof. In the behavior-tree shown in FIG. 6, a search begins from the root node, to determine that leaf nodes need to be executed are respectively a task node 0, a task node 1, a task node 2, a task node 3, and a task node 4. At the beginning, execution of the task node 0 fails, a failure is returned to a selection node 0 that is a parent node, and then the task node 1 continues to be executed. The task node 1 is successfully executed, and a success is returned to the selection node 0 that is the parent node thereof. Because the selection node 0 that is the parent node of the task node 0, the task node 1, and the task node 2 is a selection node, a success is immediately returned. Similarly, the task node 3 is successfully executed, and then a success is returned to a sequence node 1 that is a parent node thereof, and the task node 4 continues to be executed. The execution of the task node 4 fails, and a failure is returned to the selection node 1 that is the parent node thereof. Because the sequence node 1 that is the parent node of the task node 3 and the task node 4 is a sequence node, a failure is immediately returned. Because the sequence node 0 that is a parent node of the selection node 0 and the sequence node 1 is a sequence node, a return value of the sequence node 0 is determined as a failure when return values of the selection node 0 and the sequence node 1 are received. The sequence node 0 returns the return value to the root node. Therefore, after the entire behavior-tree is traversed, the result is a failure.

Figure 7:
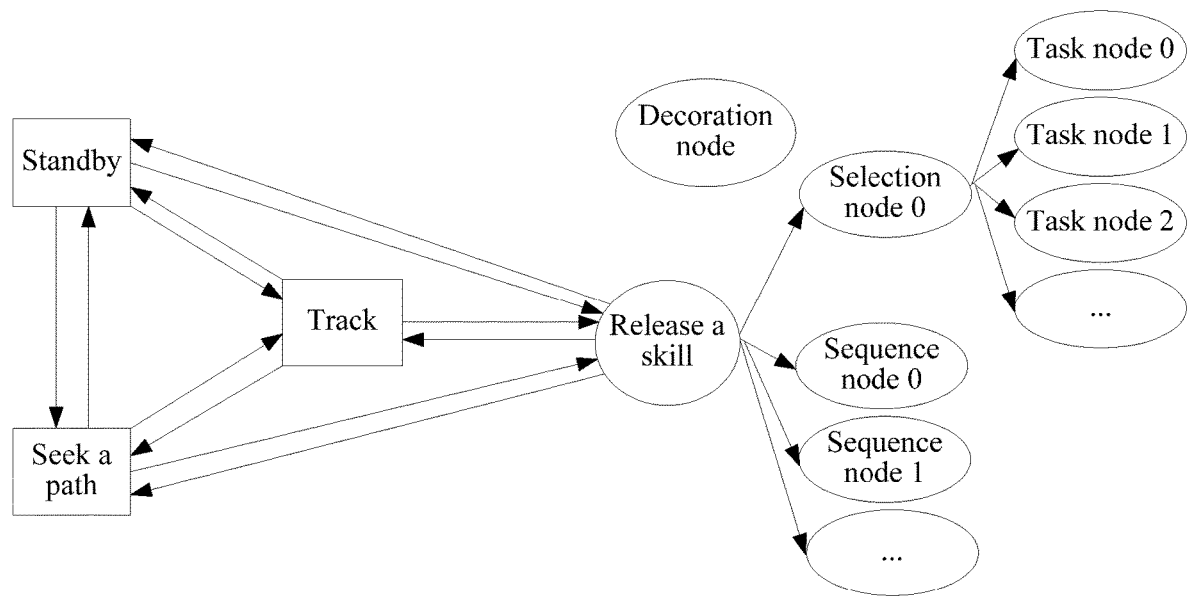
FIG. 7 is a schematic diagram of a hybrid state machine according to an embodiment of the present disclosure.

Nodes in a hybrid state machine may include a state node and a behavior-tree node, and there is a state change relationship among the nodes in the hybrid state machine. The state change relationship may specifically include a state change relationship between state nodes, between behavior-tree nodes, or between a state node and a behavior-tree node in the hybrid state machine. FIG. 7 is a schematic diagram of a hybrid state machine according to an embodiment of the present disclosure.

As shown in FIG. 7, using a hybrid state machine corresponding to a game character in a game application as an example, the hybrid state machine may include a plurality of nodes, and the plurality of nodes include a state node and a behavior-tree node. The state nodes include "stands by", "seeks a path", and "performs tracking", and the behavior-tree nodes include "releases a skill". In the hybrid state machine, there are conversion conditions between a state node and a state node, a state node and a behavior-tree node, and a behavior-tree and a behavior-tree node. The arrows in FIG. 7 may represent that there are conversion relationships among the nodes, and the specific conversion conditions among the nodes are not specifically described herein.

The behavior-tree includes a plurality of nodes. As shown in FIG. 7, the behavior-tree node may include at least one node, such as a sequence node, a selection node, a decoration node, or a task node. It should be noted that, in this embodiment of the present disclosure, quantities of state nodes and behavior-tree nodes in a hybrid state machine are not limited, a conversion condition between nodes is not limited, and a node quantity, a node type, and a node relationship in a behavior-tree are not limited.

In the technical solution provided in step S204, after detecting the operation execution event, the server determines whether a next node of a current node of the first object in a hybrid state machine is a first state node or a behavior-tree node. It should be noted that, the operation execution event may include the current node on which the first object in the hybrid state machine is located, or may include a target node to which the first object is converted after an operation corresponding to the current node is performed, that is, the next node of the current node. When triggered by the operation execution event, the first object may be converted from the current node to the next node in the hybrid state machine, where the next node may be a state node, or may be a behavior-tree node.

In the technical solution provided in step S206 and step S208, a state corresponding to any state node (including a first state node) in the hybrid state machine includes an operation performed on the first object, and a behavior-tree corresponding to any behavior-tree node (including a first behavior-tree node) in the hybrid state machine includes an operation performed on the first object. When the server determines that the next node of the current node is the first state node, the server performs on the first object an operation in a first state corresponding to the first state node; or when the server determines that the next node of the current node is the first behavior-tree node, the server performs on the first object an operation in a first behavior-tree corresponding to the first behavior-tree node. It should be noted that, the operation is in the first state corresponding to the first state node and the operation corresponding to the first behavior-tree are not limited in this embodiment of the present disclosure.

Accordingly, the hybrid state machine may integrate advantages from the finite state machine and the behavior-tree, so that a plan or program that needs to comply with a procedure is processed using the behavior-tree, and a behavior triggered by an event or some abnormal cases are processed using the finite state machine. Not only a state change in an abnormal case or a special case can be processed, but also a series of periodical behaviors can be executed according to a plan.

In an actual application scenario, as shown in FIG. 7, a game character in a game application mainly has four states: standby, tracking, seeking a path, and releasing a skill. The state of releasing a skill is relatively complex, and many different skills need to be arranged and combined in a particular manner to enrich skill performance of the game character. Therefore, in one embodiment, the releasing a skill is considered as a major general state and is managed using the behavior-tree, and conversion between the state of releasing a skill and another state such as standby, tracking, or seeking a path is controlled by using the finite state machine. The finite state machine may be maintained by using program code, to ensure stability of processing various cases by AI in most cases. During actual usage, a stack based finite state machine is selected as the finite state machine, and this can further reduce complexity brought by conversion between a plurality of states. In the state of releasing a skill, management is performed by using the behavior-tree, and a game character skill planner needs only to be responsible for editing and modifying the behavior-tree, without a need to be concerned with a conversion relationship between the behavior-tree and another external state. Inside the behavior-tree, most logics are only combination of skills and control of phases, and an entire AI logic is not affected. Therefore, the planner may work independently without any assistance of a program designer. In this manner, the planner may be concerned only with skills needed by the planner, to control the attacking process, and to balance the sense of rhythm of the game, greatly reducing workload of the planner. In addition, in one embodiment, disruption and recovery may be very conveniently implemented. Considering an example in which a game character is dizzy upon which a skill is released, execution resumes from a disruption point after the dizziness of the game character is ended. It is very difficult to resolve this problem by using a conventional behavior-tree, or it requires many tasks to resolve this problem by using the conventional behavior-tree. However, in one embodiment, an external finite state machine is used, and a dizzy state is added to the finite state machine. When dizzy is triggered, AI changes from a current state to the dizzy state, and after the dizziness is ended, the previous state resumes. Therefore, the state disruption and recovery are significantly conveniently and quickly implemented.

Optionally, Step S204 of determining whether a next node of the current node of the first object in a hybrid state machine is a first state node or a first behavior-tree node may include: when the operation execution event indicates an operation triggered by an event or an abnormal operation, determining that the next node of the current node is the first state node; or when the operation execution event indicates an operation of a process type, determining that the next node of the current node is the first behavior-tree node.

In one embodiment, the server can determine whether the next node of the current node is the first state node or the first behavior-tree node according to the operation indicated by the detected operation execution event. The operation indicated by the operation execution event may include an operation triggered by an event, an abnormal operation, an operation of a process type, or the like. In one embodiment, content of the operation indicated by the operation execution event is not limited, and may further other content in addition to the foregoing listed content. Descriptions are not further repeated herein one by one by using examples. In one embodiment, whether the next node of the current node is the first state node or the first behavior-tree node is determined according to the operation indicated by the detected operation execution event, achieving the objective of accurately determining a type of the next node of the current node, and being capable of performing different operations on the first object according to different node types.

Optionally, step S208 of performing on the first object an operation in a first behavior-tree corresponding to the first behavior-tree node includes: performing on the first object an operation corresponding to each leaf node in the first behavior-tree.

In one embodiment, if the server determines that the next node of the current node that is of the first object and that is in the hybrid state machine is a first behavior-tree node, the server may perform an operation on the first object, where the operation is in the first behavior-tree corresponding to the first behavior-tree node. For example, when the first object is a game character and the first behavior-tree node releases a skill, the operation in the first behavior-tree may include adjusting skill strength, selecting a skill type, or the like. The first behavior-tree may include one or more leaf nodes, and each leaf node corresponds to an operation in one first behavior-tree, that is, the first behavior-tree may include one or more operations. When performing an operation on the first object, where the operation is in the first behavior-tree corresponding to the first behavior-tree node, the server may perform an operation corresponding to each leaf node in the first behavior-tree. The specific execution process is already described when the principle of the behavior-tree is described, and details are not described herein again.

After the operation corresponding to each leaf node in the first behavior-tree has been performed, an attribute of the first object may be affected, for example, a life value or a remaining skill amount of a game character. In one embodiment, an operation of a process type is performed on the first object by using the behavior-tree, so that a very complex conversion relationship can be prevented from being set for the finite state machine, and a service technical effect of increasing efficiency of controlling an object in an application to perform an operation is achieved.

Optionally, before step S202 of detecting an operation execution event, the followings may also be performed.

Step S2012: The server obtains first configuration information, where the first configuration information is used for indicating the state node, the behavior-tree node, and the state change relationship.

The first configuration information may be information based on which the hybrid state machine is generated for the first object, and may be used for indicating a state node, a behavior-tree node, and a state change relationship in the hybrid state machine. It should be noted that, the state change relationship may include a state change relationship between state nodes, behavior-tree nodes, or a state node and a behavior-tree node. The first configuration information may include a quantity of state nodes in the hybrid state machine, a quantity of behavior-tree nodes, a conversion condition between the state nodes, a conversion condition between the behavior-tree nodes, a conversion condition between a state node and a behavior-tree node, an operation in a state corresponding to a state node, an operation in a behavior-tree corresponding to a behavior-tree node, and the like. In one embodiment, the first configuration information is not limited, and the first configuration information may be correspondingly adjusted according to a requirement in an actual application scenario. The first configuration information may be set and adjusted by a user according to an actual requirement.

Step S2014: The server generates the hybrid state machine for the first object according to the first configuration information.

Specifically, after obtaining the first configuration information, the server may generate the hybrid state machine of the first object according to the first configuration information. For example, the server may set a state node in the hybrid state machine according to the quantity of state nodes in the first configuration information, may set a behavior-tree node in the hybrid state machine according to the quantity of behavior-tree nodes, may set a change relationship between the state nodes in the hybrid state machine according to the conversion condition between the state nodes in the first configuration information, may set a change relationship between the behavior-tree nodes in the hybrid state machine according to the conversion condition between the behavior-tree nodes in the first configuration information, may set a change relationship between a state node and a behavior-tree node in the hybrid state machine according to the conversion condition between the state node and the behavior-tree node in the first configuration information, may configure an operation in a state corresponding to a state node in the hybrid state machine according to the operation in the state corresponding to the state node in the hybrid state machine, and/or may configure an operation in a state corresponding to a behavior-tree node in the hybrid state machine according to the operation in the behavior-tree corresponding to the behavior-tree node in the first configuration information, and so on. The foregoing lists only some configuration operations for the hybrid state machine of the first object, and the process of generating the hybrid state machine for the first object according to the first configuration information may further include any other configuration operations.

In one embodiment, the first configuration information required to generate a hybrid state machine for a first object is obtained in advance, and the first configuration information may be set according to a requirement in an actual application scenario, so that an actual requirement of a user can be met. In addition, obtaining the first configuration information required to generate the hybrid state machine for the first object can reduce the generation time of the hybrid state machine.

Optionally, after step S2014 of generating the hybrid state machine for the first object according to the first configuration information, the followings may also be performed.

Step S2016: The server obtains second configuration information.

The second configuration information may be used for updating the hybrid state machine generated for the first object according to the first configuration information, where the second configuration information may include the content in the first configuration information and may further include content other than the first configuration information, for modifying the operation in the state corresponding to the state node in the hybrid state machine, for modifying the operation in the behavior-tree corresponding to the behavior-tree node in the hybrid state machine, for modifying the conversion condition and the change relationship among the nodes in the hybrid state machine, for adding or deleting a node in the hybrid state machine, for adding or deleting a conversion condition and a change relationship among the nodes in the hybrid state machine, and so on. The second configuration information is not specifically limited, and the second configuration information may include any other content.

Step S2018: The server updates the hybrid state machine according to the second configuration information.

Specifically, after obtaining the second configuration information, the server may update the hybrid state machine according to the second configuration information. This may include updating a node in the hybrid state machine, may include updating a change relationship between nodes in the hybrid state machine, and so on.

Optionally, step S2018 of updating the hybrid state machine according to the second configuration information may include at least one of the following: updating a state change relationship between an existing state node, an existing behavior-tree node, an existing state node, and/or an existing behavior-tree node that are in the hybrid state machine; deleting a state change relationship between an existing state node, an existing behavior-tree node, an existing state node, and/or an existing behavior-tree node that are in the hybrid state machine; and adding a state node and/or a behavior-tree node to the hybrid state machine, and/or establishing a state change relationship between the added state node or behavior-tree node and an existing state node or behavior-tree node.

The foregoing updating operations performed on the hybrid state machine are only examples. It should be noted that, the updating operations performed on the hybrid state machine are not limited in the present disclosure, and may further include another update operation in addition to the foregoing listed update operations. Descriptions are not further provided herein one by one by using examples. In one embodiment, the second configuration information used for updating the hybrid state machine is obtained in advance, so that an update time of the hybrid state machine can be reduced; the hybrid state machine is updated in real time, so that real-time performance and accuracy of the hybrid state machine can be improved, so as to use the hybrid state machine to increase efficiency of performing an operation on the first object.

It should be noted that, according to the foregoing method embodiments, for brief descriptions, the method embodiments are described as a combination of a series of actions. However, a person skilled in the art should understand that, the present disclosure is not limited by an action sequence that is described, because some steps may be performed in another sequence or simultaneously according to the present disclosure. In addition, a person skilled in the art should also understand that all the embodiments described in this specification are exemplary embodiments, and the related actions and modules are not necessarily required in the present disclosure.

According to the foregoing descriptions of implementations, the person skilled in the art may understand that the method according to the foregoing embodiments may be implemented by using software and a necessary general hardware platform, or certainly may be implemented by using hardware. Based on such an understanding, the technical solutions of the present disclosure may be implemented in a form of a software product. The computer software product is stored in a storage medium (such as a ROM/RAM, a magnetic disk, or an optical disc) and includes several instructions for instructing a terminal device (which may be a mobile phone, a computer, a server, a network device, or the like) to perform the methods described in the embodiments of the present disclosure.

Figure 8:
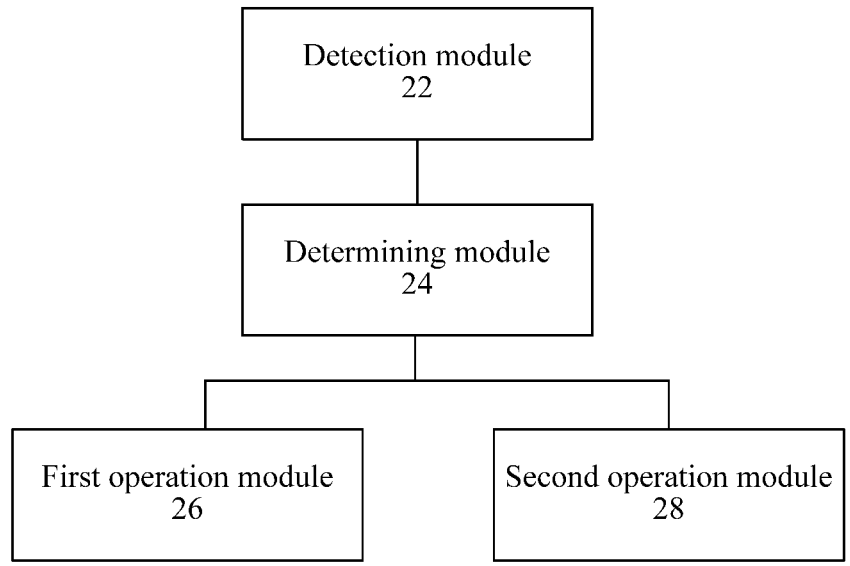
FIG. 8 is a schematic diagram of a state control apparatus according to an embodiment of the present disclosure.

According to an embodiment of the present disclosure, a state control apparatus for implementing the foregoing state control method is also provided. FIG. 8 is a schematic diagram of a state control apparatus according to an embodiment of the present disclosure. As shown in FIG. 8, the apparatus may include a detection module 22, a determining module 24, a first operation module 26, and a second operation module 28.

The detection module 22 is configured to detect an operation execution event, the operation execution event being used for requesting to operate a first object in a first application. The determining module 24 is configured to determine whether a next node of the current node of the first object in a hybrid state machine is a first state node or a first behavior-tree node, nodes in the hybrid state machine including state nodes and behavior-tree nodes, and there being a state change relationship among the nodes in the hybrid state machine. The first operation module 26 is configured to: if it is determined that the next node of the current node is the first state node, perform an operation on the first object, the operation being in a first state corresponding to the first state node. The second operation module 28 is configured to: if it is determined that the next node of the current node is the first behavior-tree node, perform an operation on the first object, the operation being in a first behavior-tree corresponding to the first behavior-tree node.

It should be noted that, in one embodiment, the detection module 22 may be configured to perform step S202 described above, the determining module 24 may be configured to perform step S204 described above, the first operation module 26 may be configured to perform step S206 described above, and the second operation module 28 may be configured to perform step S208 in described above.

Further, it should be noted that, examples and application scenarios implemented by the foregoing modules and the corresponding steps are the same, but are not limited to the content disclosed above. It should be noted that, the foregoing modules may be run, as a part of the apparatus, in the hardware environment shown in FIG. 1, and may be implemented by using software or may be implemented by using hardware.

According to the foregoing modules, when detecting an operation execution event, a server determines whether a next node of the current node of the first object in a hybrid state machine is a first state node or a first behavior-tree node; and if the next node of the current node is the first state node, performs on the first object an operation in a first state corresponding to the first state node; or if the next node of the current node is the first behavior-tree node, performs on the first object an operation in a first behavior-tree corresponding to the first behavior-tree node, so as to achieve the objective of using a finite state machine and a behavior-tree to jointly control an entity in an application to perform an operation, thereby increasing efficiency of performing the operation by the entity in the application, and resolving a technical problem of low efficiency when using a finite state machine to control an entity in an application to perform an operation.

Figure 9:
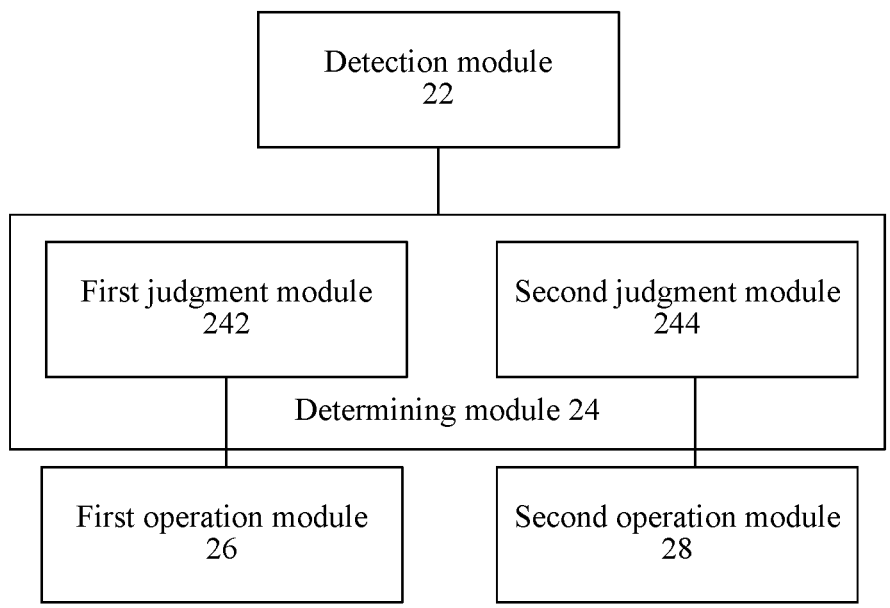
FIG. 9 is a schematic diagram of a state control apparatus according to an embodiment of the present disclosure.

Optionally, FIG. 9 is a schematic diagram of a state control apparatus according to an embodiment of the present disclosure. As shown in FIG. 9, the determining module 24 may include a first judgment module 242 and a second judgment module 244. The first judgment module 242 is configured to: if the operation execution event indicates an operation triggered by an event or an abnormal operation, determine that the next node of the current node is the first state node; and the second judgment module 244 is configured to: if the operation execution event indicates an operation of a process type, determine that the next node of the current node is the first behavior-tree node.

In one embodiment, the server can determine whether the next node of the current node is the first state node or the first behavior-tree node according to the operation indicated by the detected operation execution event. The operation indicated by the operation execution event may include an operation triggered by an event, an abnormal operation, an operation of a process type, or the like. In one embodiment, content of the operation indicated by the operation execution event is not limited, and may further include other content in addition to the foregoing listed content. In one embodiment, whether the next node of the current node is the first state node or the first behavior-tree node is determined according to the operation indicated by the detected operation execution event, achieving an objective of accurately determining a type of the next node of the current node, and being capable of performing different operations on the first object according to different node types.

Figure 10:
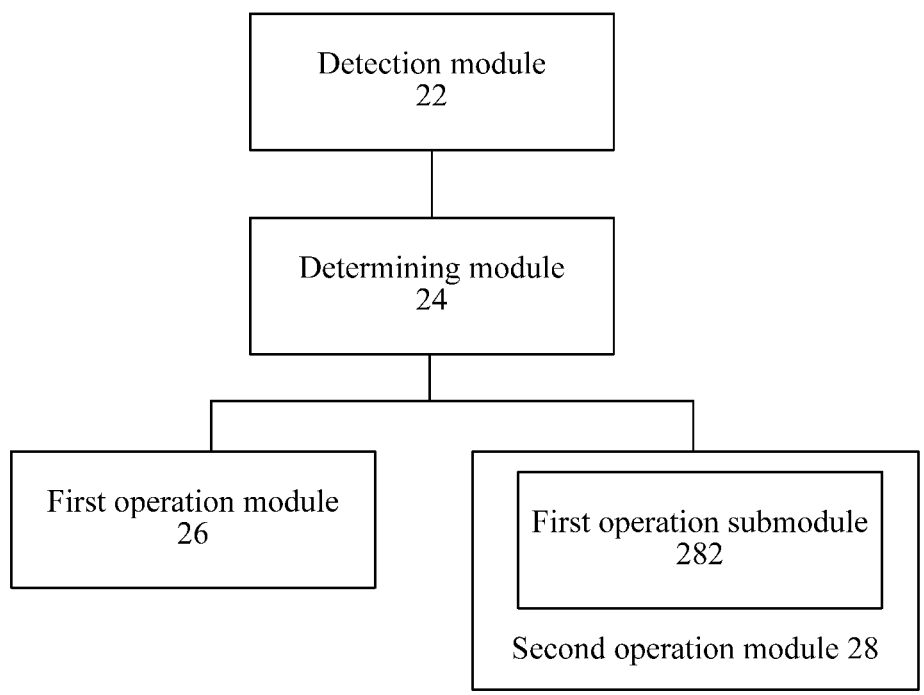
FIG. 10 is a schematic diagram of another state control apparatus according to an embodiment of the present disclosure.

Optionally, FIG. 10 is a schematic diagram of another state control apparatus according to an embodiment of the present disclosure. As shown in FIG. 10, the second operation module 28 may include a first operation submodule 282. The first operation submodule 282 is configured to perform an operation on the first object, where the operation corresponding to each leaf node in the first behavior-tree.

In one embodiment, the first behavior-tree may include one or more leaf nodes, and each leaf node corresponds to an operation in one first behavior-tree. That is, the first behavior-tree may include one or more operations. If the server determines that the next node of the current node that is of the first object and that is in the hybrid state machine is a first behavior-tree node, the server may perform an operation on the first object, where the operation is in the first behavior-tree corresponding to the first behavior-tree node. For example, when the first object is a game character and the first behavior-tree node releases a skill, the operation in the first behavior-tree may include adjusting skill strength, selecting a skill type, or the like. The specific execution process of performing an operation on the first object, where the operation corresponds to each leaf node in the first behavior-tree is already described when the principle of the behavior-tree is described.

After the operation corresponding to each leaf node in the first behavior-tree has been performed, an attribute of the first object may be affected, for example, a life value or a remaining skill amount of a game character. In one embodiment, an operation of a process type is performed on the first object by using the behavior-tree, so that a very complex conversion relationship can be prevented from being set for the finite state machine, increasing efficiency of controlling an object in an application to perform an operation.

Figure 11:
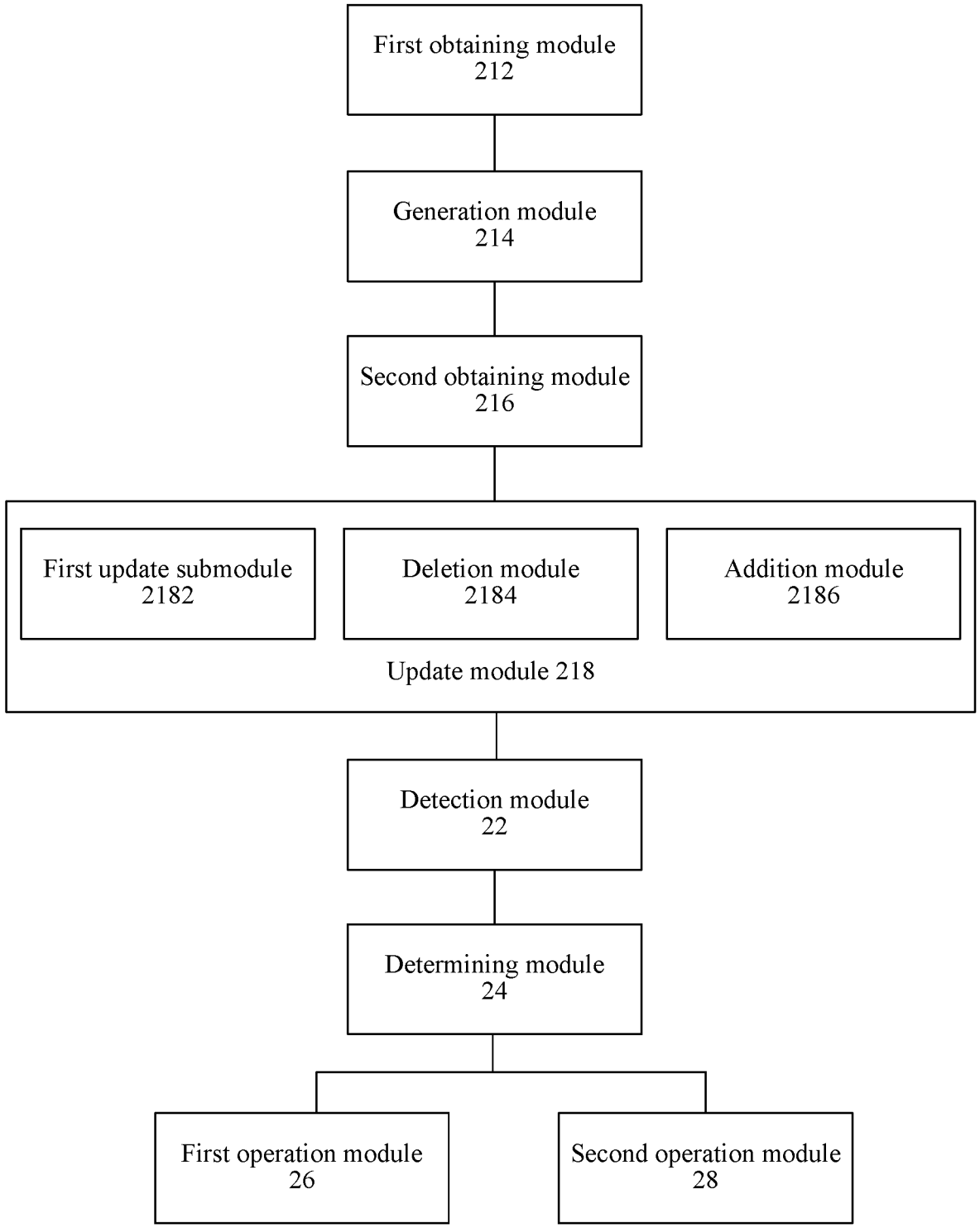
FIG. 11 is a schematic diagram of another state control apparatus according to an embodiment of the present disclosure.

Optionally, FIG. 11 is a schematic diagram of another state control apparatus according to an embodiment of the present disclosure. As shown in FIG. 11, the state control apparatus in one embodiment may further include a first obtaining module 212 and a generation module 214. The first obtaining module 212 is configured to: before the server detects the operation execution event, obtain first configuration information, where the first configuration information is used for indicating the state node, the behavior-tree node, and the state change relationship. The generation module 214 is configured to generate the hybrid state machine for the first object according to the first configuration information.

It should be noted that, the first obtaining module 212 may be configured to perform step S2012 described above, and the generation module 214 may be configured to perform step S2014 described above.

The first configuration information may be information based on which the hybrid state machine is generated for the first object, and may be used for indicating a state node, a behavior-tree node, and a state change relationship in the hybrid state machine. It should be noted that, the state change relationship may include a state change relationship between state nodes, behavior-tree nodes, or a state node and a behavior-tree node. The first configuration information may include the number of state nodes in the hybrid state machine, the number of behavior-tree nodes, conversion conditions between the state nodes, conversion conditions between the behavior-tree nodes, conversion conditions between a state node and a behavior-tree node, an operation in a state corresponding to a state node, an operation in a behavior-tree corresponding to a behavior-tree node, and the like. The first configuration information is not limited herein, and the first configuration information may be correspondingly adjusted according to a requirement in an actual application scenario, and the first configuration information may be set and adjusted by a user according to an actual requirement.

After obtaining the first configuration information, the server may generate the hybrid state machine of the first object according to the first configuration information. For example, the server may set a state node in the hybrid state machine according to the quantity of state nodes in the first configuration information, may set a behavior-tree node in the hybrid state machine according to the quantity of behavior-tree nodes, may set a change relationship between the state nodes in the hybrid state machine according to the conversion condition between the state nodes in the first configuration information, may set a change relationship between the behavior-tree nodes in the hybrid state machine according to the conversion condition between the behavior-tree nodes in the first configuration information, may set a change relationship between a state node and a behavior-tree node in the hybrid state machine according to the conversion condition between the state node and the behavior-tree node in the first configuration information, may configure an operation in a state corresponding to a state node in the hybrid state machine according to the operation in the state corresponding to the state node in the hybrid state machine, may configure an operation in a state corresponding to a behavior-tree node in the hybrid state machine according to the operation in the behavior-tree corresponding to the behavior-tree node in the first configuration information, and so on. The foregoing lists only some configuration operations for the hybrid state machine of the first object. A process of generating the hybrid state machine for the first object according to the first configuration information may further include any other configuration operation.

In one embodiment, the first configuration information required to generate a hybrid state machine for a first object is obtained in advance, and the first configuration information may be set according to a requirement in an actual application scenario, so as to meet an actual requirement of a user. In addition, obtaining the first configuration information required to generate the hybrid state machine for the first object can reduce the generation time of the hybrid state machine.

Optionally, as shown in FIG. 11, the state control apparatus in one embodiment may further include a second obtaining module 216 and an update module 218. The second obtaining module 216 is configured to: after the server generates the hybrid state machine for the first object according to the first configuration information, obtain second configuration information. The update module 218 is configured to update the hybrid state machine according to the second configuration information.

It should be noted that, the second obtaining module 216 may be configured to perform step S2016 described above, and the update module 218 may be configured to perform step S2018 described above.

The second configuration information may be used for updating the hybrid state machine generated for the first object according to the first configuration information, where the second configuration information may include the content in the first configuration information and may further include content other than the first configuration information, for modifying the operation in the state corresponding to the state node in the hybrid state machine, for modifying the operation in the behavior-tree corresponding to the behavior-tree node in the hybrid state machine, for modifying the conversion condition and the change relationship among the nodes in the hybrid state machine, for adding or deleting a node in the hybrid state machine, for adding or deleting a conversion condition and a change relationship among the nodes in the hybrid state machine, and so on. In one embodiment, the second configuration information is not specifically limited, and the second configuration information may include any other content.

Optionally, as shown in FIG. 11, the update module 218 may include at least one of a first update submodule 2182, a deletion module 2184, and an addition module 2186. The first update submodule 2182 is configured to update a state change relationship between an existing state node, and/or an existing behavior-tree node, and/or an existing state node, and an existing behavior-tree node that are in the hybrid state machine. The deletion module 2184 is configured to delete a state change relationship between an existing state node, and/or an existing behavior-tree node, and/or an existing state node, and an existing behavior-tree node that are in the hybrid state machine. The addition module 2186 is configured to: add a state node and/or a behavior-tree node to the hybrid state machine, and/or establish a state change relationship between the added state node and/or behavior-tree node and an existing state node and/or an existing behavior-tree node.

The foregoing update operations performed on the hybrid state machine are only examples. It should be noted that, the update operations performed on the hybrid state machine are not limited in the present disclosure, and may further include another update operation in addition to the foregoing listed update operations. In one embodiment, the second configuration information used for updating the hybrid state machine is obtained in advance, so that an update time of the hybrid state machine can be reduced; the hybrid state machine is updated in real time, so that real-time performance and accuracy of the hybrid state machine can be improved, so as to use the hybrid state machine to increase efficiency of performing an operation on the first object.

Further, it should be noted that, examples and application scenarios implemented by the foregoing modules and the corresponding steps may be the same, but are not limited to the content disclosed above. It should be noted that, the foregoing modules may be run, as a part of the apparatus, in the hardware environment shown in FIG. 1, and may be implemented by using software, or may be implemented by using hardware. The hardware environment includes a network environment.

Figure 12:
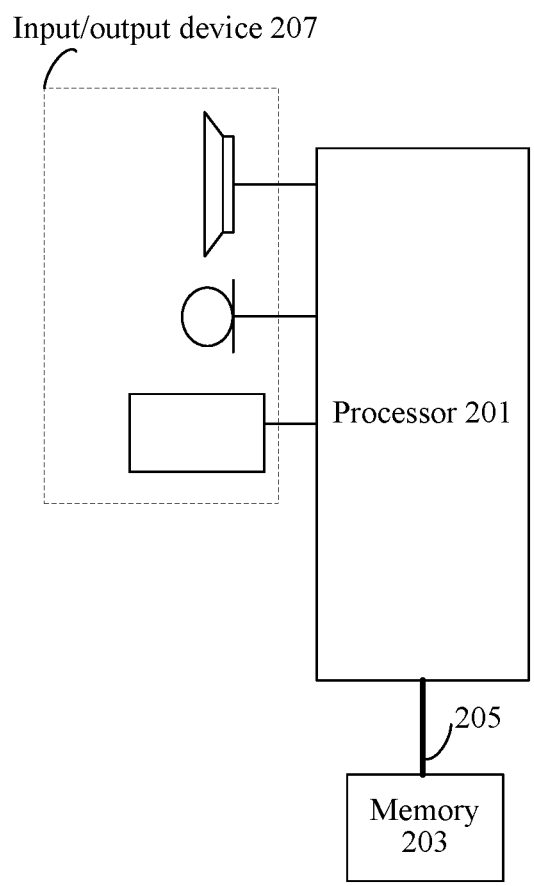
FIG. 12 is a structural block diagram of a terminal according to an embodiment of the present disclosure.

According to an embodiment of the present disclosure, a server and/or terminal for implementing the foregoing state control method is further provided. FIG. 12 is a structural block diagram of a server and/or terminal according to an embodiment of the present disclosure.

As shown in FIG. 12, the server and/or terminal may include: one or more (only one is shown in the figure) processors 201, a memory 203, and a transmission apparatus 205. As shown in FIG. 12, the terminal may further include an input/output device 207.

The memory 203 may be configured to store software programs and modules, such as program instructions/modules corresponding to the state control method and apparatus in the embodiments of the present disclosure. The processor 201 runs the software programs and modules stored in the memory 203, so as to execute various function applications and data processing, that is, to implement the foregoing state control method. The memory 203 may include a high-speed random memory, and may also include a nonvolatile memory such as one or more magnetic storage devices, a flash memory, or another nonvolatile solid-state memory. In some embodiments, the memory 203 may further include memories remotely disposed relative to the processor 201, and these remote memories may be connected to the terminal through a network. Instances of the network include, but are not limited to, the Internet, an intranet, a local area network, a mobile communications network, and a combination thereof. Specifically, the memory 203 is configured to store an application program.

The transmission apparatus 205 is configured to receive or send data by using a network, and may be further configured to transmit data between a processor and a memory. Specific examples of the foregoing network may include a wired network and a wireless network. In an example, the transmission apparatus 205 includes a network interface controller (NIC) that may be connected to another network device and a router by using a network cable, thereby communicating with the Internet or a local area network. In an example, the transmission apparatus 205 is a radio frequency (RF) module that is configured to communicate with the Internet in a wireless manner.

The processor 201 may use the transmission apparatus 205 to invoke an application program stored in the memory 203, to perform the following steps: detecting an operation execution event, the operation execution event being used for requesting to operate a first object in a first application; determining whether a next node of the current node of the first object in a hybrid state machine is a first state node or a first behavior-tree node, nodes in the hybrid state machine including state nodes and behavior-tree nodes, and there being a state change relationship among the nodes in the hybrid state machine; and if it is determined that the next node of the current node is the first state node, performing on the first object an operation in a first state corresponding to the first state node; or if it is determined that the next node of the current node is the first behavior-tree node, performing on the first object an operation in a first behavior-tree corresponding to the first behavior-tree node.

The processor 201 is further configured to perform the following steps: if the operation execution event indicates an operation triggered by an event or an abnormal operation, determining that the next node of the current node is the first state node; or if the operation execution event indicates an operation of a process type, determining that the next node of the current node is the first behavior-tree node.

The processor 201 is further configured to perform the following step: performing an operation on the first object, where the operation corresponds to each leaf node in the first behavior-tree.

The processor 201 is further configured to perform the following steps: before the server detects the operation execution event, obtaining first configuration information, where the first configuration information is used for indicating the state node, the behavior-tree node, and the state change relationship; and generating the hybrid state machine for the first object according to the first configuration information, where there is a state change relationship between the state node and the behavior-tree node in the hybrid state machine.

The processor 201 is further configured to perform the following steps: after the server generates the hybrid state machine for the first object according to the first configuration information, obtaining second configuration information; and updating the hybrid state machine according to the second configuration information.

The processor 201 is further configured to perform the following steps: updating a state change relationship between an existing state node, and/or an existing behavior-tree node, and/or an existing state node, and an existing behavior-tree node that are in the hybrid state machine; deleting a state change relationship between an existing state node, and/or an existing behavior-tree node, and/or an existing state node, and an existing behavior-tree node that are in the hybrid state machine; and adding a state node and/or a behavior-tree node to the hybrid state machine, and/or establish a state change relationship between the added state node and/or behavior-tree node and an existing state node and/or an existing behavior-tree node.

According to the embodiments of the present disclosure, a server and/or terminal for implementing a state control method and apparatus are provided. When detecting an operation execution event, the server determines whether a next node of a current node of the first object in a hybrid state machine is a first state node or a first behavior-tree node; and if the next node of the current node is the first state node, performs on the first object an operation in a first state corresponding to the first state node; or if the next node of the current node is the first behavior-tree node, performs on the first object an operation in a first behavior-tree corresponding to the first behavior-tree node, so as to achieve an objective of using a finite state machine and a behavior-tree to jointly control an entity in an application to perform an operation, thereby increasing efficiency of performing the operation by the entity in the application, and resolving a technical problem of low efficiency when using a finite state machine to control an entity in an application to perform an operation.

A person of ordinary skill in the art may understand that, the structure shown in FIG. 12 is only exemplary, and the terminal may be a terminal device such as a smartphone (such as an Android mobile phone or an iOS mobile phone), a tablet computer, a palmtop computer, and a mobile Internet device (MID), or a PAD. FIG. 12 does not limit the structure of the foregoing electronic apparatus. For example, the terminal may further include more or less components (such as a network interface and a display apparatus) than those shown in FIG. 12, or has a configuration different from that shown in FIG. 12.

The person of ordinary skill in the art may understand that all or some of the steps in the methods of the foregoing embodiments may be implemented by a program instructing related hardware of a server and/or terminal device. The program may be stored in a computer readable storage medium. The storage medium may include: a flash drive, a read-only memory (ROM), a random-access memory (RAM), a magnetic disk, an optical disc, or the like.

One embodiment further provides a storage medium. Optionally, in one embodiment, the storage medium may be configured to execute program code of a state control method.

Optionally, in one embodiment, the foregoing storage medium may be located in at least one of a plurality of network devices in the network shown in the foregoing embodiment.

Optionally, in one embodiment, the storage medium is configured to store program code used to execute the followings.

S1: A server detects an operation execution event, where the operation execution event is used for requesting to operate a first object in a first application.

S2: The server determines whether a next node of the current node of the first object in a hybrid state machine is a first state node or a first behavior-tree node, where nodes in the hybrid state machine include a state node and a behavior-tree node, and there is a state change relationship among the nodes in the hybrid state machine.

S3: If it is determined that the next node of the current node is the first state node, the server performs on the first object an operation in a first state corresponding to the first state node.

S4: If it is determined that the next node of the current node is the first behavior-tree node, the server performs on the first object an operation in a first behavior-tree corresponding to the first behavior-tree node.

Optionally, the storage medium is further configured to store program code used for performing the following steps: if the operation execution event indicates an operation triggered by an event or an abnormal operation, determining that the next node of the current node is the first state node; or if the operation execution event indicates an operation of a process type, determining that the next node of the current node is the first behavior-tree node.

Optionally, the storage medium is further configured to store program code used for performing the following step: performing an operation on the first object, where the operation corresponds to each leaf node in the first behavior-tree.

Optionally, the storage medium is further configured to store program code used for performing the following steps: before detecting the operation execution event, obtaining first configuration information, where the first configuration information is used for indicating the state node, the behavior-tree node, and the state change relationship; and generating the hybrid state machine for the first object according to the first configuration information, where there is a state change relationship between the state node and the behavior-tree node in the hybrid state machine.

Optionally, the storage medium is further configured to store program code used for performing the following steps: after the server generates the hybrid state machine for the first object according to the first configuration information, obtaining second configuration information; and updating the hybrid state machine according to the second configuration information.

Optionally, the storage medium is further configured to store program code used for performing the following steps: updating a state change relationship between an existing state node, and/or an existing behavior-tree node, and/or an existing state node, and an existing behavior-tree node that are in the hybrid state machine; deleting a state change relationship between an existing state node, and/or an existing behavior-tree node, and/or an existing state node, and an existing behavior-tree node that are in the hybrid state machine; and adding a state node and/or a behavior-tree node to the hybrid state machine, and/or establish a state change relationship between the added state node and/or behavior-tree node and an existing state node and/or an existing behavior-tree node.

Optionally, in one embodiment, the storage medium may include but is not limited to various mediums that can store program code, for example, a USB disk, a read-only memory (ROM), a random-access memory (RAM), a mobile disk, a magnetic disk, and an optical disc.

The sequence numbers of the embodiments of the present disclosure are merely for description purpose but do not indicate the preference of the embodiments.

When being implemented in a form of software functional unit and sold or used as independent products, the integrated units in the foregoing embodiments may be stored the foregoing computer-readable storage medium. Based on such understanding, a technical solution of the present disclosure may be embodied in a software product form. The computer software product is stored in a storage medium, and includes several instructions used to make one or more computer devices (which may be a personal computer, a server, and a network device) perform all or some steps of the method in the embodiments of the present disclosure.

In the embodiments of the present disclosure, the descriptions about the embodiments have respective emphases. For a portion that is not described in an embodiment, refer to a related description in another embodiment.

In the several embodiments provided in the present application, it should be understood that the disclosed client may be implemented in other manners. The apparatus embodiments described in the foregoing are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the units or modules may be implemented in electronic or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

Described in the foregoing are only exemplary implementations of the present disclosure. It should be pointed out that, the person of ordinary skill in the art may further make several improvements and modifications without departing from the principle of the present disclosure. These improvements and modifications should also fall within the protection scope of the present disclosure.

What is claimed is:

1. A state control method, comprising:
   detecting, by a server, an operation execution event, the operation execution event being used for requesting to operate on an object;
   determining, by the server, whether a next node of a current node of the object in a hybrid state machine is a first state node or a first behavior-tree node, wherein the hybrid state machine includes a finite state machine and a behavior-tree connected to the finite state machine via the current node, wherein the finite state machine includes the first state node, a second state node, and a third state node, wherein:
   prior to grouping the second state node and the third state node to form a grouped state node, the first state node is connected to the third state node to effect a state change of the object upon a fourth condition being triggered, and the second state is connected to the third state node to effect another state change of the object upon the fourth condition being triggered; and after the second state node and the third state node are grouped to form the grouped state node, a transaction from the first state node to the second state node is triggered upon occurrence of a first condition, a transaction from the first state node to the third state node is triggered upon occurrence of a second condition, a transaction from the group state node to the first state node is triggered upon occurrence of a third condition different than the first condition or the second condition, and a transition from the grouped state node to the third state node is triggered upon the fourth condition,
   wherein the behavior-tree includes the first behavior-tree node and a second behavior-tree node different than the first behavior-tree node, and wherein a state change relationship exists in the hybrid state machine, and the state change relationship includes the transition from the group-state node to the first state node upon occurrence of the third condition, a transition between the first behavior-tree node and the second behavior-tree node, and a transition between one of the first and the group state nodes and one of the first and the second behavior-tree nodes; and
   when it is determined that the next node of the current node is the first state node, performing, by the server, on the object an operation in a state corresponding to the first state node, including:
      transitioning the object from the first state node to the first behavior-tree node, the first behavior-tree node being connected to a selection node and a sequence node, wherein the first state node represents a first state of the object, the first state of the object including a state of standby, a state of tracking, a state of seeking a path, or a state of releasing a skill, and wherein the object includes a game character; and
      transitioning the object from the first behavior-tree node to one of the selection node or the sequence node, wherein the selection node reports a failure only after all child nodes of the selection node each report a failure, and wherein the sequence node reports a success only after all child nodes of the sequence node each report a success; and
   when it is determined that the next node of the current node is the first behavior-tree node, performing, by the server, on the object an operation in a behavior-tree corresponding to the first behavior-tree node.

2. The method according to claim 1, wherein the determining, by the server, whether the next node of the current node of the object in the hybrid state machine is the first state node or the first behavior-tree node comprises:
   when the operation execution event indicates an operation triggered by an event or an abnormal operation, determining, by the server, that the next node of the current node is the first state node; and
   when the operation execution event indicates an operation of a process type, determining, by the server, that the next node of the current node is the first behavior-tree node.

3. The method according to claim 1, wherein, before the detecting, by the server, the operation execution event, the method further comprises:
   obtaining, by the server, first configuration information, wherein the first configuration information is used for indicating the first state node, the first behavior-tree node, and the state change relationship; and
   generating, by the server, the hybrid state machine for the object according to the first configuration information.

4. The method according to claim 3, wherein, after the generating, by the server, the hybrid state machine for the object according to the first configuration information, the method further comprises:
   obtaining, by the server, second configuration information; and
   updating, by the server, the hybrid state machine according to the second configuration information.

5. The method according to claim 4, wherein the updating, by the server, the hybrid state machine according to the second configuration information comprises at least one of the following:
   updating, by the server, a state change relationship between two existing state nodes, between two existing behavior-tree nodes, or between an existing state node and an existing behavior-tree node that are in the hybrid state machine;
   deleting, by the server, a state change relationship between two existing state nodes, between two existing behavior-tree nodes, or between an existing state node and an existing behavior-tree node that are in the hybrid state machine; and
   adding, by the server, a state node or a behavior-tree node to the hybrid state machine, and establishing a state change relationship between the added state node or behavior-tree node and an existing state node or behavior-tree node.

6. A state control apparatus, comprising: a memory storing computer program instructions; and a processor coupled to the memory and, when executing the computer program instructions, configured to perform:
   detecting an operation execution event, the operation execution event being used for requesting to operate on an object;
   determining whether a next node of a current node of the first object in a hybrid state machine is a first state node or a first behavior-tree node, wherein the hybrid state machine includes a finite state machine and a behavior-tree connected to the finite state machine via the current node, wherein the finite state machine includes the first state node, a second state node, and a third state node, wherein:
      prior to grouping the second state node and the third state node to form a grouped state node, the first state node is connected to the third state node to effect a state change of the object upon a fourth condition being triggered, and the second state is connected to the third state node to effect another state change of the object upon the fourth condition being triggered; and after the second state node and the third state node are grouped to form the grouped state node, a transaction from the first state node to the second state node is triggered upon occurrence of a first condition, a transaction from the first state node to the third state node is triggered upon occurrence of a second condition, a transaction from the group state node to the first state node is triggered upon occurrence of a third condition different than the first condition or the second condition, and a transition from the grouped state node to the third state node is triggered upon the fourth condition,
   wherein the behavior-tree includes the first behavior-tree node and a second behavior-tree node different than the first behavior-tree node, and wherein a state change relationship exists in the hybrid state machine, and the state change relationship includes the transition from the group-state node to the first state node upon occurrence of the third condition, a transition between the first behavior-tree node and the second behavior-tree node, and a transition between one of the first and the group state nodes and one of the first and the second behavior-tree nodes; and
   when it is determined that the next node of the current node is the first state node, performing on the object an operation in a first state corresponding to the first state node, including:
      transitioning the object from the first state node to the first behavior-tree node, the first behavior-tree node being connected to a selection node and a sequence node, wherein the first state node represents a first state of the object, the first state of the object including a state of standby, a state of tracking, a state of seeking a path, or a state of releasing a skill, and wherein the object includes a game character; and
      transitioning the object from the first behavior-tree node to one of the selection node or the sequence node, wherein the selection node reports a failure only after all child nodes of the selection node each report a failure, and wherein the sequence node reports a success only after all child nodes of the sequence node each report a success; and
   when it is determined that the next node of the current node is the first behavior-tree node, performing on the first object an operation in a first behavior-tree corresponding to the first behavior-tree node.

7. The apparatus according to claim 6, wherein the determining whether the next node of the current node of the object in the hybrid state machine is the first state node or the first behavior-tree node comprises:
   when the operation execution event indicates an operation triggered by an event or an abnormal operation, determining that the next node of the current node is the first state node; and
   when the operation execution event indicates an operation of a process type, determining that the next node of the current node is the first behavior-tree node.

8. The apparatus according to claim 6, wherein the performing on the object the operation in the first behavior-tree corresponding to the first behavior-tree node comprises:
   performing an operation on the object, wherein the operation corresponds to each leaf node in the first behavior-tree node.

9. The apparatus according to claim 6, wherein, before the detecting, by the server, the operation execution event, the method further comprises:
   obtaining first configuration information, wherein the first configuration information is used for indicating the first state node, the first behavior-tree node, and the state change relationship; and
   generating the hybrid state machine for the first object according to the first configuration information.

10. The apparatus according to claim 9, wherein, after the generating the hybrid state machine for the object according to the first configuration information, the method further comprises:

obtaining second configuration information; and updating the hybrid state machine according to the second configuration information.

11. The apparatus according to claim 10, wherein the updating the hybrid state machine according to the second configuration information comprises at least one of the following:

updating a state change relationship between two existing state nodes, between two existing behavior-tree nodes, or between an existing state node and an existing behavior-tree node that are in the hybrid state machine;

deleting a state change relationship between two existing state nodes, between two existing behavior-tree nodes, or between an existing state node and an existing behavior-tree node that are in the hybrid state machine; and adding a state node or a behavior-tree node to the hybrid state machine, and establishing a state change relationship between the added state node or behavior-tree node and an existing state node or behavior-tree node.

12. A non-transitory storage medium storing computer readable instructions executable by at least one processor to perform:

detecting an operation execution event, the operation execution event being used for requesting to operate on an object;

determining whether a next node of a current node of the first object in a hybrid state machine is a first state node or a first behavior-tree node, wherein the hybrid state machine includes a finite state machine and a behavior-tree connected to the finite state machine via the current node, wherein the finite state machine includes the first state node, a second state node, and a third state node, wherein:

prior to grouping the second state node and the third state node to form a grouped state node, the first state node is connected to the third state node to effect a state change of the object upon a fourth condition being triggered, and the second state is connected to the third state node to effect another state change of the object upon the fourth condition being triggered; and after the second state node and the third state node are grouped to form the grouped state node, a transaction from the first state node to the second state node is triggered upon occurrence of a first condition, a transaction from the first state node to the third state node is triggered upon occurrence of a second condition, a transaction from the group state node to the first state node is triggered upon occurrence of a third condition different than the first condition or the second condition, and a transition from the grouped state node to the third state node is triggered upon the fourth condition, wherein the behavior-tree includes the first behavior-tree node and a second behavior-tree node different than the first behavior-tree node, and wherein a state change relationship exists in the hybrid state machine, and the state change relationship includes the transition from the group-state node to the first state node upon occurrence of the third condition, a transition between the first behavior-tree node and the second behavior-tree node, and a transition between one of the first and the group state nodes and one of the first and the second behavior-tree nodes; and when it is determined that the next node of the current node is the first state node, performing on the first object an operation in a first state corresponding to the first state node, including:

transitioning the object from the first state node to the first behavior-tree node, the first behavior-tree node being connected to a selection node and a sequence node, wherein the first state node represents a first state of the object, the first state of the object including a state of standby, a state of tracking, a state of seeking a path, or a state of releasing a skill, and wherein the object includes a game character; and transitioning the object from the first behavior-tree node to one of the selection node or the sequence node, wherein the selection node reports a failure only after all child nodes of the selection node each report a failure, and wherein the sequence node reports a success only after all child nodes of the sequence node each report a success; and when it is determined that the next node of the current node is the first behavior-tree node, performing on the first object an operation in a first behavior-tree corresponding to the first behavior-tree node.

13. The storage medium according to claim 12, wherein the determining whether the next node of the current node of the object in the hybrid state machine is the first state node or the first behavior-tree node comprises:

when the operation execution event indicates an operation triggered by an event or an abnormal operation, determining that the next node of the current node is the first state node; and when the operation execution event indicates an operation of a process type, determining that the next node of the current node is the first behavior-tree node.

14. The storage medium according to claim 12, wherein the performing on the object an operation in the first behavior-tree corresponding to the first behavior-tree node comprises:

performing an operation on the object, wherein the operation corresponds to each leaf node in the first behavior-tree node.

15. The storage medium according to claim 12, wherein, before the detecting the operation execution event, the computer readable instructions further cause the at least one processor to perform:

obtaining first configuration information, wherein the first configuration information is used for indicating the state node, the behavior-tree node, and the state change relationship; and generating the hybrid state machine for the first object according to the first configuration information.

16. The storage medium according to claim 15, wherein, after the generating the hybrid state machine for the object according to the first configuration information, the computer readable instructions further cause the at least one processor to perform:

obtaining second configuration information; and updating the hybrid state machine according to the second configuration information.

17. The storage medium according to claim 16, wherein the updating the hybrid state machine according to the second configuration information comprises at least one of the following:

updating a state change relationship between two existing state nodes, between two existing behavior-tree nodes, or between an existing state node and an existing behavior-tree node that are in the hybrid state machine;

deleting a state change relationship between two existing state nodes, between two existing behavior-tree nodes, or between an existing state node and an existing behavior-tree node that are in the hybrid state machine; and adding a state node or a behavior-tree node to the hybrid state machine, and establishing a state change relationship between the added state node or behavior-tree node and an existing state node or behavior-tree node.

18. The method according to claim 1, wherein performing on the object the operation in the behavior-tree further comprises:

managing the operation according to the first behavior-tree node using the behavior tree; and effecting a conversion between the first behavior-tree node and the first state node using the finite state machine.

* * * * *